Feb. 3, 1925.

L. DI MAIO

FOLDING SCISSORS

Filed July 21, 1923

1,524,694

INVENTOR
Louis Di Maio
BY
Fred C. Fischer
ATTORNEY

Patented Feb. 3, 1925.

1,524,694

UNITED STATES PATENT OFFICE.

LOUIS DI MAIO, OF NEWARK, NEW JERSEY.

FOLDING SCISSORS.

Application filed July 21, 1923. Serial No. 652,920.

*To all whom it may concern:*

Be it known that I, LOUIS DI MAIO, a subject of the King of Italy, residing at Newark, in the county of Essex and State of New Jersey, have invented certain new and useful Improvements in Folding Scissors, of which the following is a specification.

This invention relates to folding scissors, and has as one of its objects to provide an implement capable of being folded into small compass to permit of its being readily carried in the pocket of a garment, or extended to produce an efficient pair of scissors suited to perform any purpose for which ordinary scissors are used.

Another purpose is to combine within one of the handles or bows of the implement a knife blade and a file or the like within the other, each being held in an extremely rigid manner when extended and safely protected when folded, in the manner of a common pocket knife.

A further aim is in the provision of a neat appearing, compact pocket tool of practical usefulness, that can be cheaply manufactured.

These several objects are attained by the novel design, construction and combination of parts hereafter described and shown in the accompanying drawing, forming a part of this disclosure, and in which:—

As shown, each handle presents two thin plate elements 10 and 11, the former having extensions 12 containing oval openings 13 suited to receive the thumb and fingers in operating the implement and between the side plates are fillers 14 adjacent the finger openings.

Figure 3:
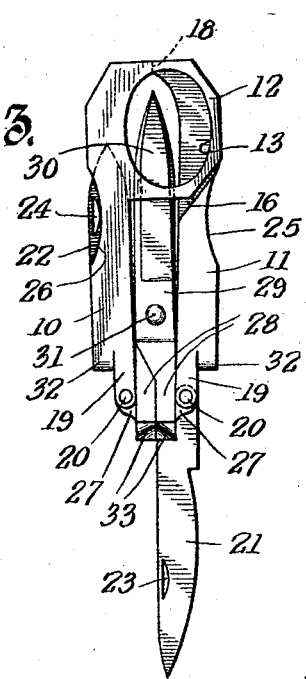
Figure 3 is a side view of the device showing the knife blade extended.

Adjacent the fillers and throughout the bar portions of the handle are spaces 15 between the side plates, and the plates 11 are formed with recesses 16 on their outer sides suited to receive the elements 12 when the handles are closed, as in Fig. 3, at which time the abutments 18 of the fillers 14 are in contact.

Figure 1:
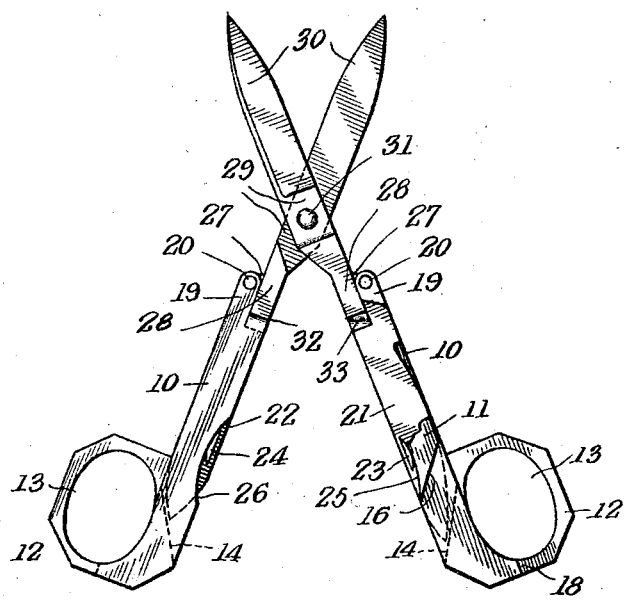
Figure 1 is a side elevational view showing an embodiment of the invention with the scissor blades extended ready for use, parts being broken away to show the construction.
Figure 2:
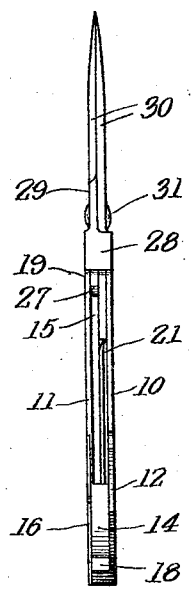
Figure 2 is an edge view of the same.

The ends of the plate or bar portions of the handles, opposite the eyes 13, are formed with extensions 19 in which are fixed rivets 20, acting as pivots on one side for the offset shank of the knife blade 21 and on the other side for the file 22, each being substantially alike in thickness and profile and provided respectively with nail nicks 23 and 24, accessible through the recesses 25 and 26 in the handles, the angular inner edges of the fillers 14 acting as stops to limit the entrance of the blades into the handle spaces 15, as shown best in Fig. 1.

Also pivoted on the rivets 20, alongside the knife and file shanks, are thin lugs 27 extending laterally outward from the shanks 28 of the scissor centers 29 from which extend the blades 30, these centers being held in operative relation by the usual riveted pivot 31.

Figure 4:
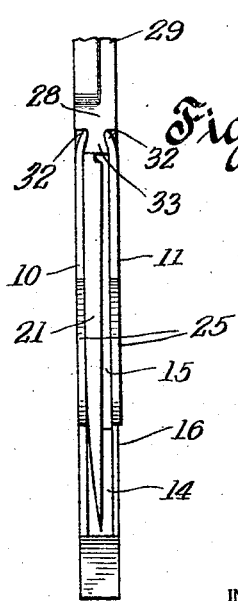
Figure 4 is an enlarged fragmentary view looking from between the handles when the scissor blades are extended, showing the manner in which the blade shank is gripped by the handle sides.

The ends of the shanks 28 are suited to abut the corresponding ends 32 of the handles which are bent inwardly, as shown in Fig. 4, to engage on opposite sides of dovetail lugs 33 extending from the ends of the scissor blade shanks 28 holding them firmly but removably by the resilience of the handle side elements 10 and 11, the lugs 33 being slightly tapered in cross section to permit easy engagement.

As the scissor blade shanks and handles are of uniform thickness, substantially level surfaces are obtained on both sides of the implement, which is of parallel thickness throughout when the scissor blades are folded between the handles as shown in Fig. 3.

The operation of folding or opening the knife and file will be obvious, but it may be pointed out that when the scissor blades are extended, the lugs 33 are in contact with the shanks of the knife and file blades, absolutely preventing their displacement and when the knife or file blades are extended, the necked portion of their shanks are in contact with the same lugs which act as rigid abutments for them, supporting any strain to which they may be subjected in use. To fold the scissors from an operative position, as in Fig. 1, to the closed position illustrated in Fig. 3, it is merely necessary to break the joints at the tongues or lugs 33, close the blades and turn the handles on their pivots 20 to envelope the blades, in which position all of the several blades are fully guarded and protected from being injured or from doing injury to any article with which the implement may come in contact.

As changes of construction could be made within the scope of the invention, it is intended that all matter contained in the foregoing description or shown in the accompanying drawings shall be interpreted as illustrative and not in a limiting sense.

Having thus described my invention, what I claim as new and desire to secure by Letters Patent, is:—

1. In a folding scissors, a pair of pivoted shear blades and a pair of pivoted handles, the pivot for the handles being independent from the pivot of said shear blades, a second set of blades pivotally secured on said scissors, said handles provided with oppositely disposed recesses to interfit when folded to encase the second set of blades, and means for limiting the motion of said shear blades to opening position and for limiting the unfolding of said handles and shear shank to position of alignment.

2. In a folding scissors, a pair of shear blades having pivoted shank portions, a pair of pivoted handles on said shank portions, the pivot for the handles being independent from the pivot of said shear blades, a second set of blades pivotally secured on said scissors, said handles provided with oppositely disposed recesses to interfit when folded to encase said second set of blades, and abutments on said handles for limiting the motion of said shear blades to opening position and for limiting the unfolding of said handles and shear shank to position of alignment.

This specification signed and witnessed this 20th day of July, 1923.

LOUIS DI MAIO.

Witnesses:
FREDK. C. FISCHER,
FERDINAND NOLL.